J. S. Yinger.
Hay Fork.
No. 85,416. Patented Dec. 29, 1868.
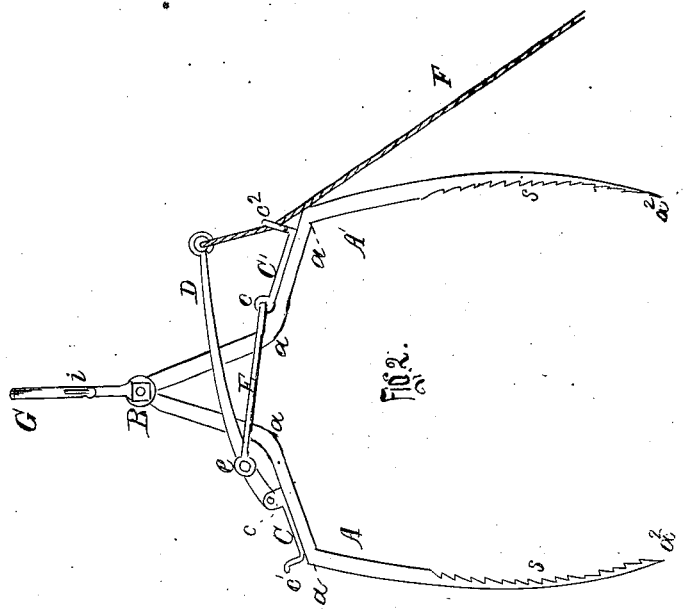
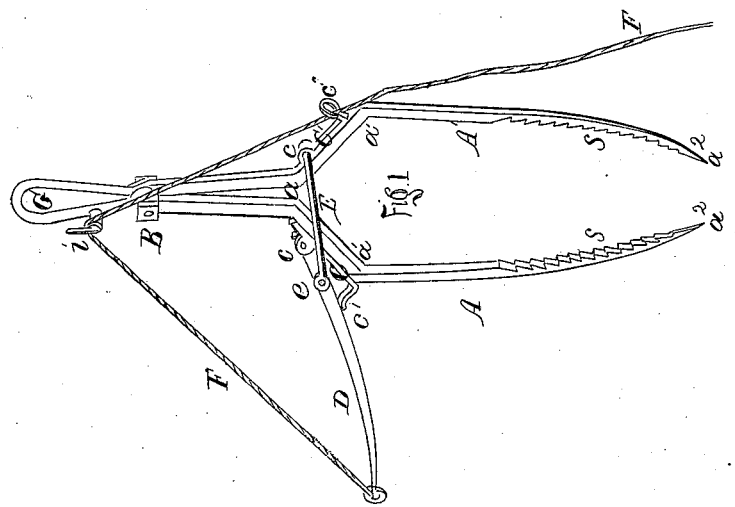
Witnesses:
C. A. Pettit
F. C. Beach
Inventor:
J. S. Yinger
by Munn & Co
Attorneys

United States Patent Office.

JOHN S. YINGER, OF MANCHESTER TOWNSHIP, PENNSYLVANIA.

Letters Patent No. 85,416, dated December 29, 1868.

IMPROVEMENT IN HORSE HAY-FORKS.

The Schedule referred to in these Letters Patent and making part of the same.

*To all whom it may concern:*

Be it known that I, JOHN S. YINGER, of Manchester township, in the county of York, and State of Pennsylvania, have invented a new and improved Hay-Fork; and I do hereby declare that the following is a full, clear, and exact description of the construction and operation of the same, reference being had to the accompanying drawings, making a part of this specification, in which—

Figure 1 is a perspective view.

Figure 2 is a side elevation.

The object of this invention is to provide for public use a horse hay-fork, having two pivoted jaws, so constructed and operating that they can be readily opened and closed to receive or discharge the hay.

In the drawings—

A A' represent the two jaws, pivoted at their upper end to a short, stout bolt, B, each of the jaws extending downward from the pivot B, in a straight line, to the point $a$, thence outward and slightly downward, to the point $a^1$, and thence downward, and curving slightly inward to the point $a^2$, the extremity of the tines, and being serrated at $s$, on their inner side, near their lower extremity.

The jaws being thus constructed, a plate, C or C', is fastened upon the upper side of the inclined shoulder $a\ a^1$ of each. The two plates are of nearly similar form, each having a lug, $c$, at its inner, and a projection, $c^1$ or $c^2$, at its outer end, the projection $c^1$ being simply a rest for the lever, and the projection $c^2$ being an eye, through which passes the cord, hereinafter described.

To the lug upon plate C is pivoted a lever, D, and to that upon plate C', a link, E, the link passing around the jaws, just above the angle $a$, and being jointed to the lever at $e$.

A cord, F, is fastened to the outer end of the lever, and extends through the eye $c^2$, and thence to a convenient point to be operated by the attendant.

A link, G, may be attached to the upper extremity of the jaws, for convenience in raising and lowering the instrument by means of a tackle, and a short curved arm, $i$, carrying a sleeve-roller, if thought necessary, may be fixed to the side of such link, as a guide for the cord F, its operation being fully shown in fig. 1.

In using the instrument, the tines are opened, by throwing the lever over to the right, as seen in fig. 2, and in that position they are thrust into the hay. The lever is then thrown over to the left, as shown in fig. 1, which brings them together, and causes them to grasp and hold securely the hay that may be intercepted between them. The tines being held in this position, the instrument is raised by the tackle.

It will be observed that when the lever is thrown over into the position shown in fig. 1, it locks the tines together, the joint $e$ coming below the fulcrum $c$, so that the expansive pressure of the hay against the tines only causes them to hold it the more firmly.

Having thus described my invention,

What I claim as new, and desire to secure by Letters Patent, is—

The instrument above described, consisting essentially of the jaws A A', made in the form described, the plates C C', the link E, the lever D, connected to the link at $e$, the cord F, the link G, the arm $i$, and the pivot-bolt B, all constructed, arranged, and combined, so as to operate together in the manner and for the purpose specified.

JOHN S. YINGER.

Witnesses:
GEORGE YINGER,
SAMUEL YINGER.